US010411793B1

(12) United States Patent
Ramsey et al.

(10) Patent No.: US 10,411,793 B1
(45) Date of Patent: Sep. 10, 2019

(54) DATA TRANSPORT AND TIME SYNCHRONIZATION FOR ISR SYSTEMS

(71) Applicant: Goodrich Corporation, Charlotte, NC (US)

(72) Inventors: Scott W. Ramsey, Northbridge, MA (US); Louis A. Ricci, Jr., Westford, MA (US); Jonathan C. Jarok, Chelmsford, MA (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 16/013,609

(22) Filed: Jun. 20, 2018

(51) Int. Cl.
H04B 7/212 (2006.01)

(52) U.S. Cl.
CPC .................. H04B 7/2125 (2013.01)

(58) Field of Classification Search
CPC .. H04B 7/2125; H04B 7/2126; H04B 7/2662; H04W 56/00; H04W 56/0045; H04W 56/001; H04J 2011/0096; H04J 3/0638; H04J 3/0685; H04J 3/0632; H04J 3/065; H04J 3/0655; H04J 3/0661; H04L 7/0083
USPC ................. 370/349, 324, 350, 503, 511, 512
See application file for complete search history.

(56) References Cited

U.S. PATENT DOCUMENTS

| 8,369,399 | B2 | 2/2013 | Egnal et al. |
| 8,587,661 | B2 | 11/2013 | McCubbrey |
| 8,677,920 | B1 | 3/2014 | Jeng |
| 8,855,846 | B2 | 10/2014 | Grzywna |
| 9,614,819 | B2 * | 4/2017 | Mizrahi ............... H04L 63/0485 |
| 9,760,114 | B1 * | 9/2017 | Gopalakrishnan ........ G06F 1/12 |
| 2003/0118056 | A1 * | 6/2003 | Ali ...................... H04N 21/4305 370/503 |
| 2006/0072586 | A1 * | 4/2006 | Callaway, Jr. ...... H04L 27/0014 370/395.62 |
| 2007/0071037 | A1 * | 3/2007 | Abraham ............. H04N 21/235 370/503 |
| 2010/0054244 | A1 * | 3/2010 | Tamura ................. H04J 3/0667 370/389 |
| 2010/0080249 | A1 * | 4/2010 | Li ......................... H04J 3/0688 370/503 |
| 2012/0200703 | A1 | 8/2012 | Nadir et al. |

* cited by examiner

Primary Examiner — Brenda H Pham
(74) Attorney, Agent, or Firm — Locke Lord LLP; Scott D. Wofsy; Judy R. Naamat

(57) ABSTRACT

A computer system is provided that includes devices configured to acquire input data. The system further includes a remote node (RN) configured to receive a first packet from a control node (CN). The first packet includes a packet header including a master timestamp, first control data and a CRC. The RN is also configured to verify integrity of the first control data based on the received CRC, generate and transmit to the CN a second packet. The second packet includes a packet header which includes a remote timestamp. The system also includes a CN connected with the RN via high-speed serial interfaces. The CN is configured to receive the second packet, determine status of the first packet based on the control data included in the second packet and configured to retransmit the first packet or generate and transmit a third packet based on the determined status of the first packet.

20 Claims, 5 Drawing Sheets

DATA TRANSPORT AND TIME SYNCHRONIZATION FOR ISR SYSTEMS

FIELD OF THE INVENTION

Embodiments of the present invention relate generally to field of signal processing, and specifically to data transport and time synchronization for Intelligence. Surveillance, and Reconnaissance (ISR) systems.

BACKGROUND OF THE INVENTION

ISR systems may include a plurality of sensors mounted on a plurality of airborne platforms, which can be, for example, manned or unmanned aircrafts. The sensors are used to gather information about an area of interest. Communication networks can be provided to transmit the collected image data, metadata and command and control data.

These communication networks connect systems, such as data processors, to utilize or interact with the data moved across the network. Limitations of physical network interfaces often restrict available locations of two or more processors and other elements, limiting system's performance and/or timing synchronization procedures. Furthermore, non-standard processor configurations limit the ability to use common architectural elements, algorithms, and the like.

It is desirable to have integrated mechanism for time synchronization and data integrity verification across corresponding platforms.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a multi-processor computer system for ensuring data integrity and time synchronization across a multi-domain operational platform is provided. The system includes a plurality of devices configured to acquire input data related to the multi-domain operational platform. The system further includes a remote node. The remote node includes a plurality of co-processors communicatively coupled to the plurality of devices. The plurality of co-processors are configured to control the acquisition of the input data and configured to analyze the acquired input data. The logic of the plurality of co-processors is further configured to receive a first packet from a control node. The first packet includes a packet header including at least a master timestamp, first control data and a Cyclic Redundancy Check (CRC) value associated with the first control data. The logic of the plurality of co-processors is also configured to verify integrity of the received first control data based on the received CRC value. The logic of the plurality of co-processors is further configured to generate and transmit to the control node a second packet. The second packet includes a packet header which includes at least a remote timestamp, control data, a CRC value associated with the control data and a subset of the input data. The system also includes a control node communicatively connected with the remote node via one or more high-speed serial interfaces. The control node includes one or more processors which include logic configured to receive the second packet from the remote node. The logic of the one or more processors is further configured to determine status of the first packet based on the control data included in the second packet. The logic of the one or more processors is also configured to retransmit the first packet or generate and transmit a third packet based on the determined status of the first packet. The third packet includes a packet header which includes at least a master timestamp, second control data and a CRC value associated with the second control data.

In another aspect, a method for ensuring data integrity and time synchronization across a multi-domain operational platform is provided. The method includes receiving, at a remote node, a first packet from a control node. The first packet comprising a packet header including at least a master timestamp, first control data and a CRC value associated with the first control data. Integrity of the received first control data is verified, at the remote node, based on the received CRC data. A second packet is generated and transmitted from the remote node to the control node. The second packet including a packet header further including at least a remote timestamp, control data, a CRC value associated with the control data and a subset of the input data. The second packet is received at the control node from the remote node. Status of the first packet is determined, at the control node, based on the control data in the second packet. The first packet is retransmitted or a third packet is generated and transmitted based on the determined status of the first packet. The third packet includes a packet header further including at least a master timestamp, second control data and a CRC value associated with second control data.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

Figure 1:
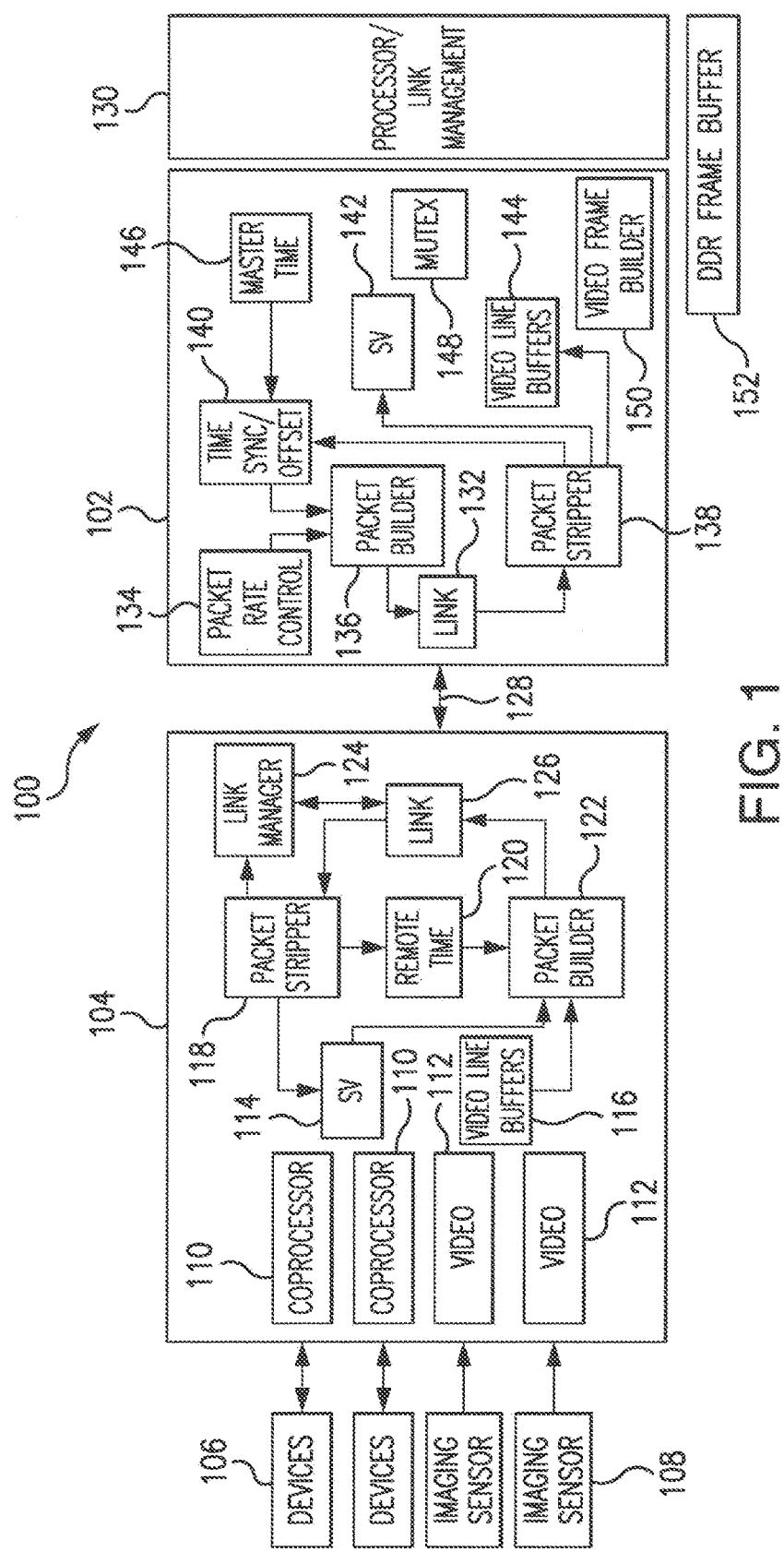
FIG. 1 is a block diagram of an exemplary architecture of a disclosed system operating in a run-time mode, according to embodiments of the present invention.

The present invention is now described more fully with reference to the accompanying drawings, in which illustrated embodiments of the present invention are shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the invention based on the below-described embodiments. Accordingly, the invention is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

As used herein, the term "image" data refers to data (or a file having data) that represents an image of a physical object. The term "video" data refers to data (or a file having data) that represents a plurality of images.

As used herein, the term "mobile platform" may refer to any vehicle with or without an on-board human pilot. For example, mobile platform may include, but are not limited to, Unmanned Aerial Vehicles (UAVs), fixed-wing UAVs, rovers, walking robots, hovercraft, submersibles, and surface vehicles, gimbaled stabilized sensor platforms and fixed image, radar platforms. The term "mobile platform" is also intended to refer to any portable electronic device such as a cellular telephone, smart phone, tablet computer, virtual reality goggle, or other suitable wireless communication device communicatively coupled to one or more sensors and running any suitable operating system. Any operable combination of the above are also considered a "mobile platform."

The term "sensor" is used herein in a broad sense and includes any type of physical sensor or controller, such as a GPS receiver, gyroscope, accelerometer, motor controller, as well as a device for measuring temperature, current, voltage, ADC (Analog to Digital Converter), DAC (Digital to Analog Converter), Digital IO, or the like. The term "image sensor" encompasses any type of image capturing device such as a video camera, radar, LIDAR, FLIR (forward looking infrared imaging) sensor, or any combination of such sensors. The term "image sensor" is also inclusive of multi-spectral imagers and groups or arrays of the same or different image capture devices. A sensor may capture information in a series of two or three dimensional arrays. The image sensor may include both active and passive cameras.

As used herein, the term "processor" is to be broadly construed to include any type of embedded processor.

Embodiments of the present invention are directed to an integrated system facilitating aggregation of image data, video data, metadata and command and control data. Advantageously, the disclosed system provides a unique mechanism for data transfer and synchronization across various platforms. As yet another advantage, the disclosed system facilitates a mechanism for data integrity through packet header data, packet Cyclic Redundancy Check (CRC) and packet re-transmit capability using particular interfaces and particular data transfer protocols. Such mechanisms and protocols can be utilized for data communications in large scale computer environments that employ high speed serial links.

With reference to FIG. 1, a block diagram of an exemplary architecture 100 of a multi-domain operational services system's operating in a run-time mode is shown. It should be understood that this and other arrangements described herein are set forth only as examples. Other arrangements and elements (e.g., machines, interfaces, functions, orders, and groupings of functions, etc.) can be used in addition to or instead of those shown, and some components may be omitted altogether. Further, many of the components described herein are functional entities that may be implemented as discrete or distributed components or in conjunction with other components, and in any suitable combination and location. Various functions described herein as being performed by one or more components may be carried out by hardware, firmware, and/or software. For instance, various functions may be carried out by a processor executing instructions stored in memory.

As shown in FIG. 1, the exemplary architecture 100 includes a control node 102 and a remote node 104. It should be understood that the architecture 100 shown in FIG. 1 is an example of an ISR platform, such as, for example, a machine vision platform. Typical machine vision platforms include pluralities of computing elements, operating systems, physical sensors (i.e., image forming sensors, gyros, accelerometers, GPS), application software and actuation controllers. In a nutshell, a machine vision system works by querying the physical sensors at defined intervals, decoding the sensor feedback, estimating where in space the system is and where it is pointing, synchronizing the capture of the image forming data and collecting all of this information in digital memory. Typically, one or more application components perform each step of this data collection. Then the application software typically runs complex routines that take the image and physical sensor data to create an output. Additionally, the active control elements of a vision system mounted on a mobile platform typically need to react to real world disturbances as detected by the wide modality of sensors. These machine vision systems are often challenged by deterministic behavioral needs exhibited by various components of a distributed system. The distributed nature of the system presents several challenges. Typically, there is a digital controller in the system that collects the sensor information and determines how to respond to this information contingent on the tasks the system intends to perform. Additionally, the machine vision system can have a plurality of electro-mechanical actuators that need to be controlled.

The architecture 100 should not be interpreted as having any dependency or requirement related to any single module/component or combination of modules/components illustrated therein.

It is noted that a plurality of devices 106 collect the variety of inertial and positional data related to the mobile ISR platform. In one embodiment, the position, velocity, and angular orientation of the mobile ISR platform may collectively be referred to as state vector parameters. According to an embodiment of the present invention, the state vector parameters are stored in state vector module 114 comprising a protected and managed read-write memory having a plurality of addressable memory locations. In one implementation, state vector module 114 is situated in the reconfigurable memory fabric shared by all elements of the remote node 104. State vector memory implemented as protected and managed multi-port random access memory ("RAM") enables concurrent processing from the complete set of processors implemented in a particular mobile platform system. Advantageously, state vector module 114 further includes state management logic to perform state vector management operations for the acquired inertial and positional data. According to an embodiment of the present invention, the state management logic coordinates sharing and updating the acquired inertial and positional data in a concurrent fashion between one or more co-processors 110 described below.

In one embodiment, co-processor(s) 110 may be configured to perform navigation component data acquisitions and system mobility assertion and control functions. In addition, co-processors 110 may be configured to actively collect auxiliary data to and from other system components, such as motor controller components and INS (Inertial Navigation System) components for instrument control purposes. For ease of discussion, the term "inertial and positional data" encompasses such auxiliary data (including motor and status data) collected from other integrated components, such as motor controller(s). In one embodiment, the one or more co-processor(s) 110 executes specific microcode instructions.

While only two co-processor components 110 are shown in FIG. 1 for ease of illustration, alternative embodiments are contemplated in which any number and combination of co-processors 110 can be implemented within the remote node 104. This number is of course limited by the size and layout of the integrated circuit used in the remote node 104.

It is contemplated herein that the co-processors 110 may operate in at least two different modes. In one embodiment these modes may include, but are not limited to, runtime and initialization modes.

The runtime mode is an operating mode that executes instructions which may be loaded via runtime mode pathway. These instructions may include read/write commands from/to the state vector module 114. In one embodiment, these instructions may include instructions to acquire inertial and positional data at predetermined collection-time intervals from the variety of devices/sensors 106 mounted on the ISR mobile platform system 100. It is noted that the co-processors 110 facilitate data transfers between the devices 106 and the state vector module 114.

In one embodiment, the initialization mode may run an initialization routine (initialization code) which enables the co-processors 110 to communicate with devices 106 directly in a so-called "pass-through" mode. Initialization code may be generated by a high-level language compiler into the embedded system programming. The length of the initialization code may be substantial and, in some examples, the initialization code can be similar in length or may even substantially exceed the main code. The initialization code may include code used for testing, profiling, debugging, etc. In other words, in an embodiment, the runtime code could be limited to simple and repetitive data flows performed in runtime operating mode, while the initialization code may include substantially complex initialization, testing and debug interfaces. Such arrangement provides more efficient resource utilization.

In a number of embodiments, the second plurality of sensors, such as imaging sensors 108 is attached to one or more video pipelines 112 and comprises image sensors such as cameras, which may be configured to transmit image data via an interface format. The captured image data is transmitted in accordance with the interface format as a stream or packet. These streams can be adapted to accord with any interface format, including but not limited to the Mobile Industry Processor Interface Alliance (MIPI) CSI-2 interface format (MIPI interface format), CameraLink interface format, a USB interface format, or a Firewire interface format.

In accordance with an embodiment of the present invention, the one or more co-processors 110 may also be communicatively coupled to imaging sensors 108 and may be configured and operational to perform ingestion of high-bandwidth image data in a substantially standard manner. Furthermore, the co-processor(s) 110 are coupled with the state vector module 114 described herein. In several embodiments, image data from the plurality of video pipelines 112 and/or from the plurality of imaging sensors 108 can be packetized by the co-processor(s) 110 by inserting the image data and/or additional data describing the image data into a packet in such a way that image processing components, such as for example, a video frame builder 150 hosted by the control node 102, can reconstruct images of a scene from the received image data and utilize additional system information related to the reconstructed images. This process of insertion of additional data describing the image data transmitted by the imaging sensors 108 is referred to hereinafter as metatagging. In one embodiment, each packet of the image data may represent one line of a corresponding image. In an embodiment of the present invention, a line may comprise a row of pixels of a corresponding image. This additional data is provided by the state vector module 114. Examples of metadata inserted by the one or more co-processor(s) include, without limitation, earth coordinate positions of a location at which the image was taken, data indicating the geo-location coordinates for the points in the Earth-Centered Earth-Fixed and/or north/east/down coordinate system corresponding to the four corners of the image and one or more timestamps indicating when an image was taken, any detected error conditions, and the like.

When the lines in an image are processed in a particular order, one or more line buffers 116 may be required to store information received from the plurality of video pipelines 112. The line buffer 116 size may be relatively large, especially for large-size images.

In accordance with an embodiment of the present invention, there is provided a packet stripper component 118 for use in the remote node 104. The packet stripper component 118 comprises a receiver for receiving and processing an uplink packet. For example, the packet stripper 118 extracts both a packet header 202 (shown in FIG. 2A) and the payload data (e.g., state vector data 214) from the received uplink packet. The packet stripper 118 may be arranged to populate the state vector memory 114 with the state vector data 214 received from the command node 102. Of note, the packet stripper 118 knows which data is stored by the state vector module 114.

In accordance with an embodiment of the present invention, the control node 102 and the remote node 104 have two independent time sources, a master time source 146 and a remote time source 120, respectively. A time source is any device that is capable of tracking the passage of time. A variety of types of time sources are contemplated herein, including a voltage-controlled temperature compensated crystal oscillator (VCTCXO), a phase locked loop oscillator, a time locked loop oscillator, a rubidium oscillator, a cesium oscillator, a trained oscillator, a microelectromechanical device (MEM), and/or other device capable of tracking the passage of time. A timestamp is a representation of the time indicated by a time source.

Since both video data and state vector data are time sensitive and since metatagging requires accurate timing information, it is fairly important for the ISR mobile platform system 100 to keep the master time source 146 and the remote time source 120 in sync. According to an embodiment of the present invention, the packet stripper 118 is configured to extract master timestamp information 208 from the header 202 of the received uplink packet and is further configured to synchronize the remote time source 120 based on the extracted master timestamp 208 information. In other words, the master time source 146 plays a role of a reference clock in the disclosed system.

Further, the remote node 104 includes a packet builder module 122. The packet builder module 122 is used by the remote node 104 to construct downlink packets to be written out to the control node 102. The downlink packets include header, state vector data and video data, as described below. The state vector data can be accessed from the local state vector module 114. Additionally, the video data is populated by the packet builder module 122 by accessing one or more video line buffers 116. The packets generated by the packet builder module 122 can be transmitted downstream to the control node 102 through a link interface 126.

According to an embodiment of the present invention, the command node 102 and remote node 104 may be communicatively coupled by a high-speed serial link 128. The high-speed serial link 128 constitutes advanced communications channels that elicit multiple layers of processing and is capable of, among other things, tolerating transmission errors. In various embodiments, the link interfaces 126 and 132 at the remote node 104 and control node 102, respectively, may comprise any standard high-speed bidirectional point-to-point interfaces for serial link communication. One option is to use the "Aurora Protocol" from Xilinx (see "Aurora Protocol Specification", SP002 (v2.0) Sep. 12, 2007, which is incorporated entirely herein by reference). Aurora is a scalable, lightweight, link-layer protocol that can be used to move data point-to-point across one or more high-speed serial links. Aurora is protocol independent, and can be used to transport industry standard protocols, such as Ethernet and TCP/IP, or proprietary protocols. The Aurora Protocol is an open standard and is available for implementation by anyone without restriction.

In addition, the remote node 104 includes a link manager 124 capable of managing the connection between the remote node 104 and the control node 102 of the system 100. More specifically, the link manager module 124 may be capable of configuring the link 128 and monitoring its status. As a non-limiting example, if the link manager 124 detects an error it may execute a particular error correction sequence.

On the control node 102, link management function may be performed by one or more processors 130. The control node processor(s) 130 and the link manager 124 hosted by the remote node 104 communicate with each other using link status 210, 230 and link control 212, 232 fields of the uplink packet header 202 and downlink packet header 222, respectively. For example, the packet stripper module 118 upon receiving an uplink data packet extracts header information from the packet and sends link status 210 and link control 212 information to the link manager 124. As shown in FIG. 1, the link manager 124 may also receive/send information from/to the link interface 126.

Still referring to the control node 102, upon receiving the downlink packet generated by the packet builder module 122, the link interface 126 of the remote node 104 forwards the received packet to the packet stripper module 138. The packet stripper module 138 comprises a receiver for receiving and processing a downlink packet. For example, the packet stripper 138 extracts both a packet header 222 (shown in FIG. 2B) and the payload data (e.g., state vector data 234) from the received downlink packet. The packet stripper 138 may be arranged to populate local state vector memory 142 and local video line buffers 144 with both the state vector data 234 and video data 238 received from the remote node 104. It should be noted that under normal operating conditions, copies of state vector data and video data maintained by respective state vector modules 114, 142 and video line buffers 116 and 144 should be substantially identical. According to an embodiment of the present invention, the packet stripper module 138 may also extract header information (e.g., remote timestamp information 228) and pass it to a time synchronization module 140.

The time synchronization module 140 may be configured to allow the control node 102 to transmit a master timestamp as part of the uplink packet, request a response from the remote node 104 and receive in response a remote timestamp 228 after a time delay corresponding to the propagation delay between the control node 102 and the remote node 104. The time synchronization module 140 may then determine the propagation delay between the control node 102 and the remote node 104. The time synchronization module 140 may then adjust the master timestamp 208 and may transmit the adjusted master timestamp 208 as part of the next uplink packet transmitted to the remote node 104. According to some embodiments, the adjusted master timestamp 208 may be further adjusted to account for the processing delay prior to transmission.

Embodiments of the present invention provide the ISR mobile platform system 100 having a configurable data transmission rate control making it adaptable to various transmission rates. More specifically, a packet rate control module 134 is coupled to a packet builder module 136 and is configured to control transfer of uplink packets over the transmission link 128. In some embodiments, the packet rate control module 134 may include one or more bandwidth control registers. The packet rate control module 134 determines a packet speed and/or size for packets transmitted from the control node 102 to the remote node 104 over the transmission link 128. Requested packet speed and/or size are stored within bandwidth control registers. In some embodiments, data transmission rate (packet speed) depends on number of bytes to be transmitted and on bandwidth of the transmission link 128.

It should be noted that since transmitted packets control clock synchronization and since clocks in both the remote time source 120 and the master time source 146 are subject to drift, it is desirable to have a data transmission rate that enables clock synchronization before any significant oscillator drift occurs. Furthermore, the data transmission rate should be greater than processing rate associated with corresponding processors. A desirable data transmission rate may be a configurable parameter.

The packet builder module 136 is used by the control node 102 to construct uplink packets to be written out to the remote node 104. The uplink packets include header and state vector data, as described below. The state vector data can be accessed from the local state vector module 142. Additionally, the master timestamp 208 is received from the time synchronization module 140. The packets generated by the packet builder module 136 can be transmitted upstream to the remote node 104 through the link interface 132.

At least in some embodiments, the control node 102 may include a memory access conflict resolution mechanism, such as MUTEX module 148. The MUTEX 148 is a blocking interface that enables the packet builder module 136 and the packet stripper module 138 to read/write a group of values from/to the state vector module 142.

The video frame builder module 150 may be configured to build a frame that mimics a frame of video data (or an image) captured by one of the imaging sensors 108. For example, the video frame builder module 150 may fill in a frame with video data received from the plurality of local video line buffers 144. In other words, the video frame builder module 150 can reconstruct images of a scene from the received image data and utilize additional system information related to the reconstructed images. Such reconstructed video frames may be used for further video data processing either by the control node 102 or another node within the ISR platform.

According to an embodiment of the present invention, the computing system shown in FIG. 1 further includes multiple physically separate arrays (banks) of relatively large off chip memory. In various embodiments this memory may comprise at least one of flash memory, dynamic random access memory (DRAM), 4×DDR (dual data rate) memory, or the like. For simplicity of discussion and illustration, these multiple banks of memory utilized for storage of video frame data are referred to hereinafter as DDR frame buffers 152. Data stored in the DDR frame buffers 152 may be used for the image processing pipeline components (not shown in FIG. 1). The image processing components may perform complex mathematical manipulation of this large size ingested data in a power efficient, deterministic manner.

In several embodiments, the processing circuitry of the control node 102 shown in FIG. 1 may be implemented utilizing System on Chip (SOC) technologies, while the processing circuitry of the remote node 104 may be implemented with programmable logic components (e.g. field programmable gate array (FPGA), or complex programmable logic device (CPLD)). In another embodiment, processing circuitry of the remote node 104 is implemented using any number of discrete logic components. In yet another embodiment, the processing circuitry of the remote node 104 is implemented using an application specific integrated circuit (ASIC).

Figure 2:
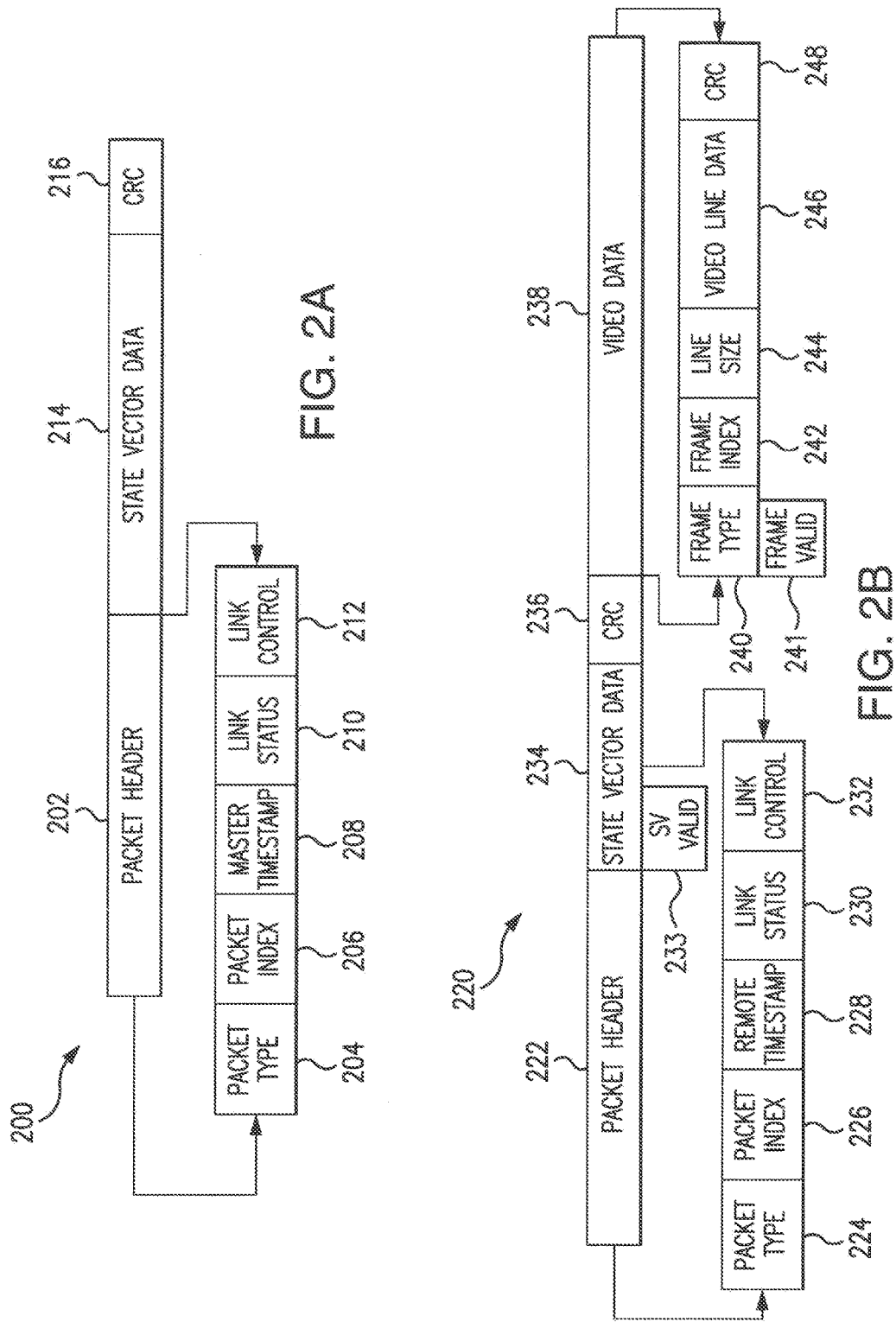
FIG. 2A illustrates the packet format of a run-time mode uplink data packet, in accordance with an embodiment of the present invention.
FIG. 2B illustrates the packet format of a run-time mode downlink data packet, in accordance with an embodiment of the present invention.

FIG. 2A illustrates the packet format 200 of a run-time mode uplink data packet in accordance with an embodiment of the present invention. The uplink data packets are sent by the control node 102 to the remote node 104 operating in a runtime mode. According to this embodiment, an uplink packet includes the packet header 202, the payload data (e.g., state vector data 214) and a CRC value 216. Each uplink packet header 202 includes a packet type field 204. The packet type field 204 is used to determine the packet format. Example packet types include but are not limited to one of the following: Command node-to-Remote node, Remote node-to-Command node, Initialization mode, Runtime mode, Retransmit and the like.

The uplink packet header 202 for this embodiment also includes a packet index field 206. Each packet index field may include an index number. For example, in some embodiments, an initial index of a first transmitted uplink packet may have an index number of 1 (or any other number, as desired), and the packet index field 206 of each subsequently transmitted uplink packet may have an index number which is incremented by one relative to the index number in the index field 206 of the uplink packet transmitted previous to it.

The uplink packet header 202 further includes a master timestamp field 208, which includes the master timestamp generated by the time synchronization module 140, as described above, and a link status field 210 which may indicate the status of the high-speed serial link 128 between the command node 102 and the remote node 104. The last field within the uplink packet header 202 is a link control field 212 that is used to communicate link control information such as link reset, link status query, link configuration, and the like to the link manager 124.

The payload data 214 may include one or more state vector parameters to be transmitted to the remote node 104. Well-known schemes exist in the art to identify "bad" data or data that has otherwise been corrupted in some way. In a CRC scheme employed by an embodiment of the present invention, a CRC value corresponding to an uplink packet is generated by the packet builder module 136 of the command node from the payload data 214 itself and is appended to the payload data 214. With the appended CRC value 216, the integrity of the payload data 214 can be checked by the receiving packet stripper module 118 of the remote node 104 which is configured to recalculate a CRC value from the payload data 214 of the received uplink packet and configured to compare the recalculated CRC value against the appended CRC value 216 included in the received uplink packet. If there is a mismatch, the payload data 214 may have been corrupted during transmission and the remote node 104 may ask the command node 102 to retransmit the corrupted packet.

FIG. 2B illustrates the packet format 220 of a run-time mode downlink data packet in accordance with an embodiment of the present invention. The downlink data packets are sent by the remote node 104 to the command node 102 operating in a runtime mode. The downlink data packets are sent by the remote node 102 in response to receiving corresponding uplink packets. It should be noted, that the remote node 104 always responds with a downlink packet whether or not it has any data to send. According to this embodiment, a downlink packet includes the packet header 222, a state vector data 234, a CRC value 236 corresponding to the state vector data 234 and captured video data 238.

The downlink packet header 222 is similar to the uplink packet header 202 and will not be described here for purposes of clarity and brevity. One noteworthy difference is that instead of the master timestamp field 208, the downlink packet header 222 includes a remote timestamp field 228. The remote timestamp field 228 includes a remote timestamp generated by the remote time source 120.

As noted above, the remote node 104 transmits a downlink packet in response to receiving an uplink packet from the command node 102. According to an embodiment of the present invention, at the start of the state vector data 234 is a flag 233 indicating whether the state vector data 234 included in the current packet is new data. More specifically, while building a downlink packet, the packet builder 122 of the remote node 104 checks the local state vector memory 114 to determine if any of the state vector parameters have new values. If so, such state vector values are inserted into a downlink packet and the state vector validity flag 233 is set to 1, for example. Otherwise, the state vector validity flag 233 is set 0 by the packet builder 122. Upon receiving the downlink packet, the packet stripper 138 of the command node 102 updates its local copy of the state vector data only if the state vector validity flag 233 is set to 1.

In various embodiments of the present invention, size of the video data field 238 may vary based on transmission medium, for example. In an embodiment illustrated in FIG. 2B the video data field 238 comprises sub-header including a frame type 240, frame index 242, line size 244, as well as video line data 246 and a CRC value corresponding to the video line data field 246. Different types of frames may be received from the one or more video pipelines 112. The frame type 240 is indicated in the sub-header of the video data field 238. Each frame type has a number of bits associated with that frame type or (in the case of a variable length frame type) a maximum size. A table of these frame types may be sent periodically on the link 128 from the command node 102 to the remote node 104. Similarly to the state vector data 234, the remote node 104 may not always have new video data to be sent. According to an embodiment of the present invention, at the start of the frame type field 240 may be a frame validity flag 241. Similarly, to the state vector validity flag 233, the frame validity flag 241 may be indicative of new/old video data included in the video data field 238. Each video frame provides a representative image as an index (e.g., frame index 242) to a set of sequential image frames. The line size field 244 may indicate the size of the subsequent video line data field 246. The video line data field includes actual line of a video image transmitted by the remote node 104 and the video line CRC value 248 is calculated based on the data contained in the video line data field 246.

Figure 3:
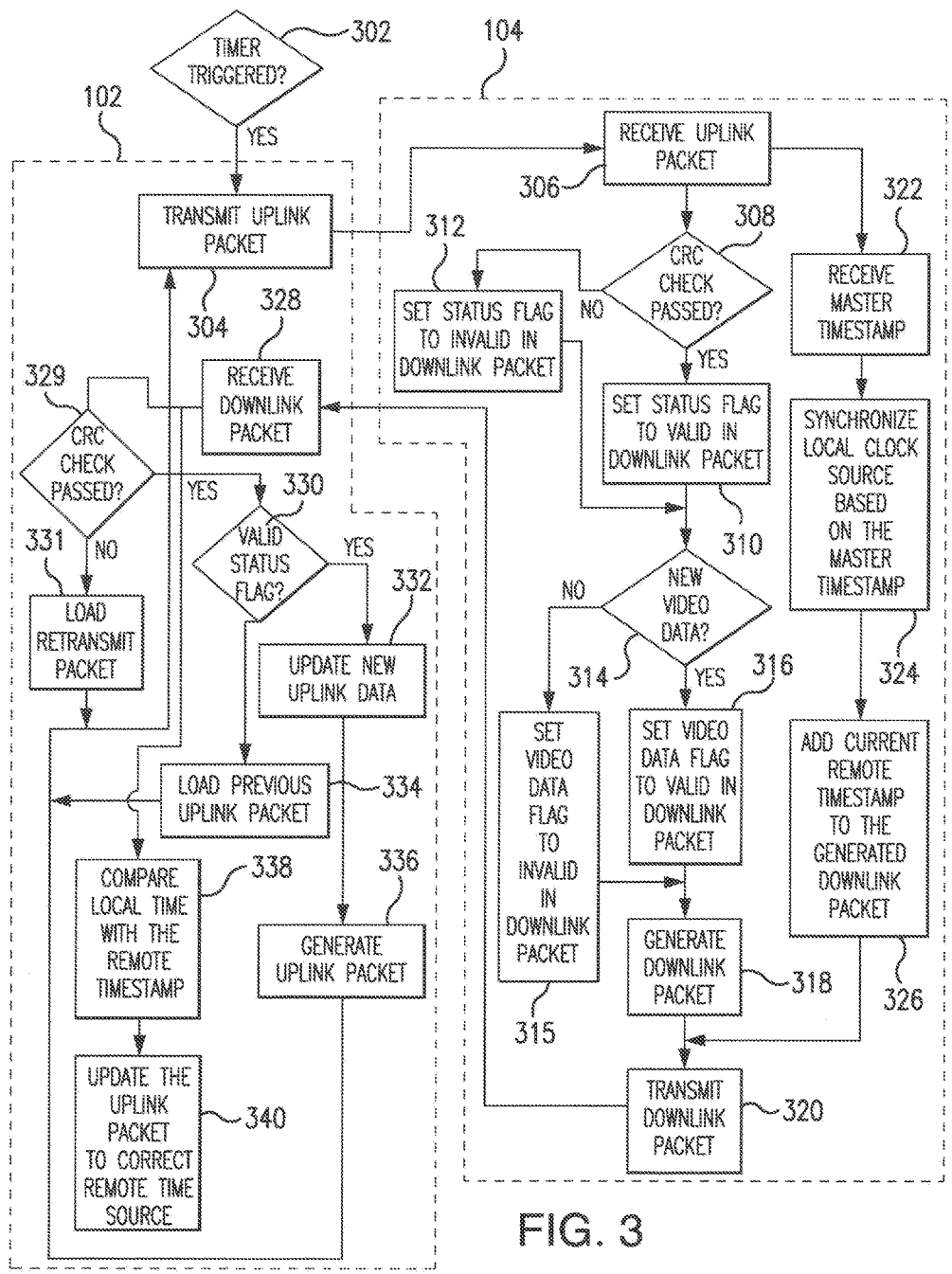
FIG. 3 is a flowchart illustrating operational steps performed by various functional components of FIG. 1, in accordance with an embodiment of the present invention.

FIG. 3 is a flowchart illustrating operational steps performed by various functional components of FIG. 1 in accordance with an embodiment of the present invention. Before turning to description of FIG. 3, it is noted that the flow diagram shown therein is described, by way of example, with reference to steps and/or elements shown in FIGS. 1, 2A and 2B, although these operational steps may be carried out in any system and are not limited to the scenario shown in the aforementioned figure. Additionally, the flow diagram in FIG. 3 illustrates an example in which operational steps are carried out in a particular order, as indicated by the lines connecting the blocks, but the various steps shown in this diagram can be performed in any order, or in any combination or sub-combination. It should be appreciated that in some embodiments some of the steps described below may be combined into a single step. In some embodiments, one or more additional steps may be included.

According to an embodiment of the present invention, at step 302, the packet builder 136 of the control node 102 determines if the timer maintained by the packet rate control module 134 has triggered. This timer controls data transfer rate. As noted above, the data transfer rate may be a configurable parameter.

In response to determining that the timer has triggered, at step 304, the packet builder module 136 transmits an uplink packet to the remote node 104 via the link interface 132. On the other side of the high-speed serial link 128, the link interface 126 of the remote node 104 receives the uplink packet (step 306) and forwards it to local packet stripper module 118. The packet stripper module 118 extracts both header and payload information from the received uplink packet.

According to an embodiment of the present invention, data integrity is achieved by means of CRC techniques. The CRC technique is used for checking and detecting errors in data transmitted over a network. The CRC algorithm and its underlying mathematics are well known to those skilled in the art. The packet stripper 118 performs a CRC check when an uplink packet is received at the remote node 104. Here, the CRC is calculated and compared with the CRC value 216 included in the uplink packet. The check is performed by the packet stripper 118 on both the header and payload portions of the received uplink packet.

Responsive to a determination that CRC check passed successfully (decision block 308, Yes branch), at step 310, the packet stripper 118 informs the packet builder 122 to set a status flag to valid in the link status 210 field of a downlink data packet. Furthermore, in response to determining that the received packet contains valid information, the packet stripper 118 passes extracted information to other modules at the remote node 104. For example, the packet stripper 118 passes the link status 210 and link control 212 data to the link manager 124 and passes the extracted master timestamp 208 to the remote time source 120. In addition, at step 310, the packet stripper 118 writes the received state vector data 214 to the local state vector memory 114.

In response to determining that the CRC check failed (decision block 308, No branch), at step 312, the packet stripper 118 informs the packet builder 122 to set a status flag to invalid in the downlink data packet. Once the packet builder 122 receives the value of the status flag it checks the plurality of video line buffers to determine if any new video data had been received from the one or more imaging sensors 108 since the last downlink packet was sent. In response to determining that new video data exists (decision block 314, No branch), at step 315, the packet builder module 122 sets the frame validity flag 241 to invalid in a downlink packet. In response to determining that new video data exists (decision block 314, Yes branch), at step 316, the packet builder module 122 sets the frame validity flag 241 to valid and copies new data into the video data field 238 of the new downlink packet. Similarly, the packet builder module 122 asks the state vector module 114 if there is any new state vector data since the last transmission of the downlink packet. If there is new state vector data, the packet builder module 122 retrieves the new state vector data and inserts it into the state vector data field 234 of the new downlink packet.

According to an embodiment of the present invention, in parallel with the steps 308-316 performed by the packet stripper 118 and packet builder 122 modules, the remote time source 120 performs steps 322-326 described below. At step 322, the remote time source 120 receives the master timestamp value 208 from the packet stripper module 118. As noted above, the control node 102 is the one driving synchronization of the clock. In other words, the remote time source 120 determines if its clock is substantially in sync with the clock operating at the control node 102. If any drift detected between the two clocks, at step 324, the remote time source 120 synchronizes its clock with the clock operating at the control node 102 based on the master timestamp value 208. Once the local clock is synchronized, the remote time source 120 adds current remote timestamp 228 to the new downlink data packet.

Next, at step 318, the packet builder 122 generates a new downlink data packet. According to an embodiment of the present invention, generation of the new downlink packet involves generation of both all header and all payload fields of the downlink data packet 220. It should be noted that generation of the new downlink packet involves generation of CRC values 236 and 248 for the new downlink packet. It is further noted that according to the protocol contemplated by the embodiments of the present invention, the packet builder 122 generates a new downlink packet at step 318 regardless if there is any new state vector or video data to be sent to the control node. If there is no new data in the packet, the corresponding status flags will indicate that. Upon generation of the new downlink packet it is transmitted to the control node via the link interface 126 (step 320).

At step 328, the link interface 132 at the control node 102 receives the downlink packet and forwards it to local packet stripper module 138. The packet stripper module 138 extracts both header and payload information from the received downlink packet. At step 329, the packet stripper module 138 performs a CRC check. In response to determining that the CRC check failed (decision block 329, No branch), at step 331, the packet stripper 138 reloads the previous transmitted uplink packet. Responsive to a determination that CRC check passed successfully (decision block 329, Yes branch), at step 330, the packet stripper module 138 determines if the status flag contained within the received downlink packet is valid. In other words, at step 330, the packet stripper module 138 determines if the previously sent uplink packet was successfully received by the remote node. If the previously sent packet was corrupted or had any other transmission errors (decision block 330, No branch), at step 334, the packet stripper module 138 notifies the packet builder 136 to reload the previous uplink packet. Once the previous uplink packet is loaded, the packet builder 136 returns back to step 304 and retransmits it whenever the timer is triggered next time. According to an embodiment of the present invention, at step 330, the packet stripper module 134 may further determine whether the newly received downlink packet contained any new state vector and/or video data based on the other status flags 233, 241. If new data is received, the packet stripper module 134 updates state vector memory 142 and/or video line buffers 144 to make them in sync with data stored by the remote node 104.

Once all new data is extracted from the received downlink packet (if any), the packet stripper 134 passes control to the packet builder module 136, which in turn starts building a new uplink packet. For example, if there are any updates to the state vector data 142 to be sent to the remote node 104, such updates are loaded into the new uplink packet as payload data 214.

According to an embodiment of the present invention, the packet stripper 138 also extracts remote timestamp 228 from the received downlink packet and passes it to the time synchronization module 140. At step 338, the time synchronization module 140 compares the received remote timestamp with the local time, optionally determines a propagation delay and sends the updated master timestamp to the packet builder module 136 (step 340). Accordingly, the uplink packet generated at step 336 by the packet builder module 136 includes the timestamp that should correct clock source at the remote node 104. Once the uplink packet is transmitted at step 304, the cycle described above is repeated.

Figure 4:
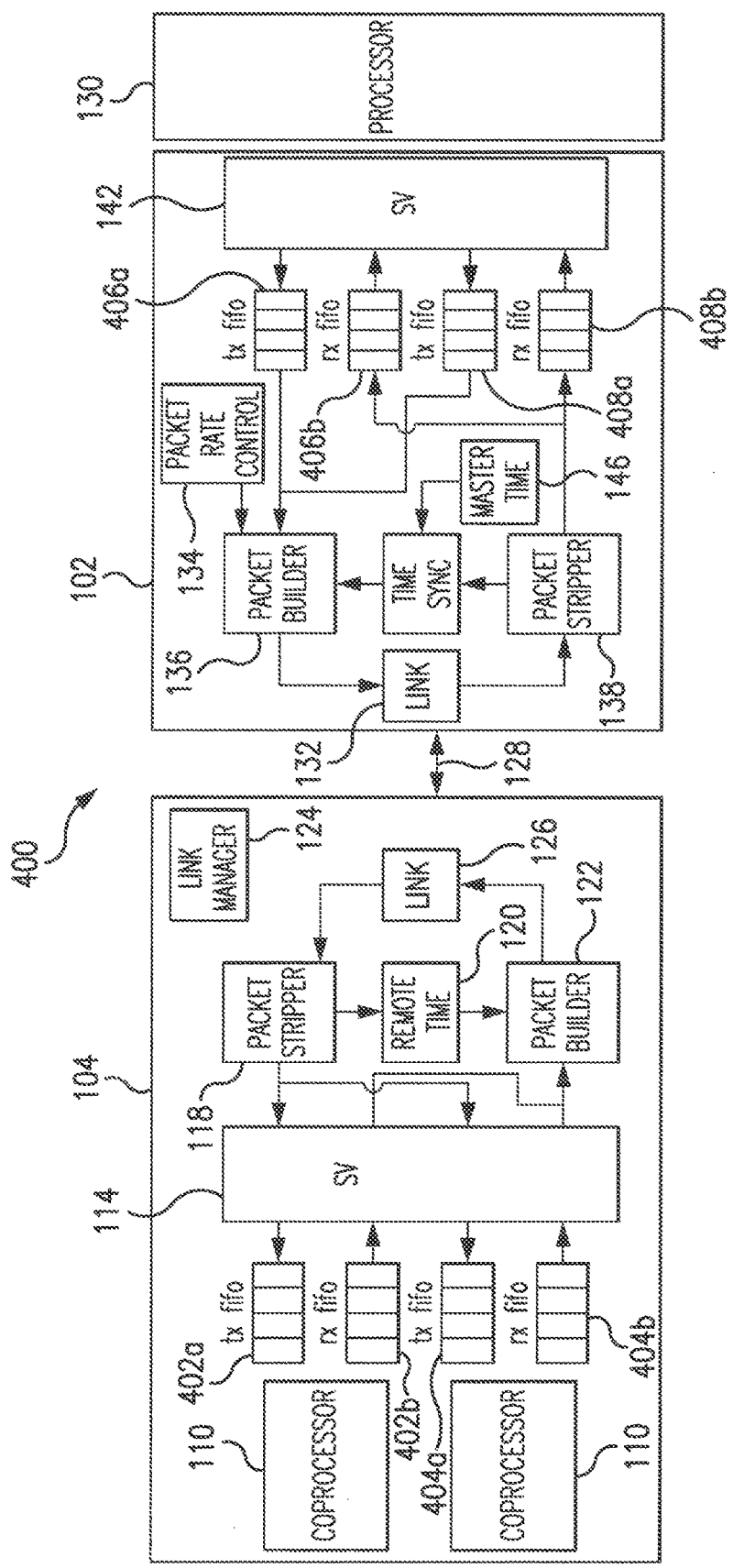
FIG. 4 is a block diagram of an exemplary architecture of a disclosed system operating in an initialization mode, according to embodiments of the present invention.

FIG. 4 is a block diagram of an exemplary architecture 100 of a multi-domain operational services system's operating in an initialization mode according to embodiments of the present invention. As noted above, the initialization mode may run an initialization routine (initialization code) which enables the co-processors 110 to communicate with devices 106 directly in a so-called "pass-through" mode. The initialization code may include code used for testing, profiling, debugging, and the like. In other words, in an embodiment, the runtime code could be limited to simple and repetitive data flows performed in runtime operating mode, while the initialization code may include substantially complex initialization, testing and debug interfaces. Arrangement illustrated in FIG. 4 provides more efficient resource utilization. In FIG. 4, elements corresponding to the elements in FIG. 1 are referred to with the same reference numerals and a repeated description is omitted.

In this embodiment, both the command node 102 and the remote node 104 employ a plurality of FIFO (First In First Out) buffers 402-408 that are optimized for more efficient interaction with their respective processors. More specifically, each co-processor 110 at the remote node 104 is associated with the two FIFO blocks 402 and 404, respectively. The Tx (Transmit) FIFO 402a, 404a and Rx (Receive) FIFO 402b, 404b memory blocks store data in 32-bit data word blocks sufficient to buffer one or more co-processor messages, but it is envisioned that the data block size could vary depending on implementation. Data (e.g., commands) are stored in the Tx FIFOs 402a and 404a in the order that the data is transmitted to the Tx FIFOs 402a and 404a from the packet stripper module 118. According to an embodiment of the present invention, the packet stripper 118 has a capability of distinguishing between data destined to each particular co-processor 110. The Rx FIFO memory blocks 402b and 404b store data in the order it is received from the respective co-processor 110. The Tx FIFOs 402a and 404a provide the stored data on demand to different co-processors 110, while the Rx FIFOs 402b and 404b provide the stored data on demand to the packet builder module 122. With respect to the control node 102, the Tx FIFOs 406a and 408a store data in the order that the data is transmitted to the Tx FIFOs 406a and 408a from the processor 130, while the Rx FIFO memory blocks 406b and 408b store data in the order it is received from the packet stripper module 138. The Tx FIFOs 406a and 408a at the command node 102 provide the stored data on demand to the packet builder module 136, while the Rx FIFOs 406b and 408b provide the stored data on demand to the processor 130.

Figure 5A:
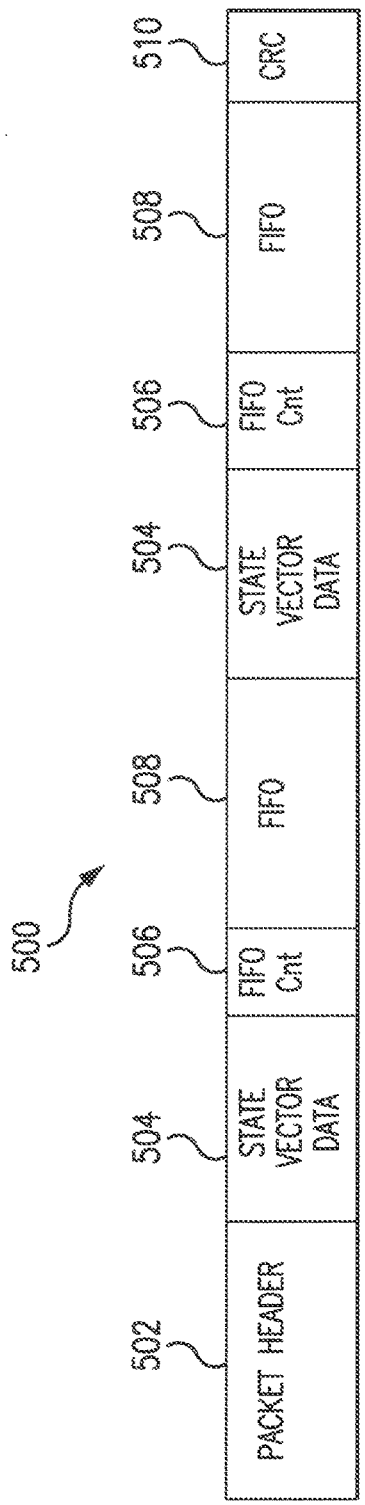
FIG. 5A illustrates the packet format of an initialization mode uplink data packet, in accordance with an embodiment of the present invention.

FIG. 5A illustrates the packet format 500 of an initialization mode uplink data packet in accordance with an embodiment of the present invention. The uplink data packets are sent by the control node 102 to the remote node 104 operating in an initialization mode. According to an embodiment of the present invention, in addition to FIFO blocks 402-408, each co-processor may have application specific information related to a command(s) being executed by the remote node 104. Accordingly, each uplink packet in addition to having a packet header 502 may contain state vector data 504 associated with each co-processor 110 and pertaining to the application specific command(s) being sent back to the remote node 104.

As illustrated in FIG. 5A, each uplink data packet (when system operates in the initialization mode) further include FIFO counter 506 and FIFO data 508 fields. It is noted that in an embodiment each FIFO field 508 can have fixed length (e.g., 12 data words). The FIFO counter 506 indicates how many of the words contained within the FIFO data field 508 are valid. The integrity of each uplink packet is verified using CRC value 510 calculated for each state vector data 504, FIFO counter 506 and FIFO field 508 blocks associated with respective co-processors 110. It should be noted that if the remote node 104 contained n number of co-processors 110, the packet fields 504-508 would be repeated n times within each packet. Each block would contain data associated with a particular co-processor.

Figure 5B:
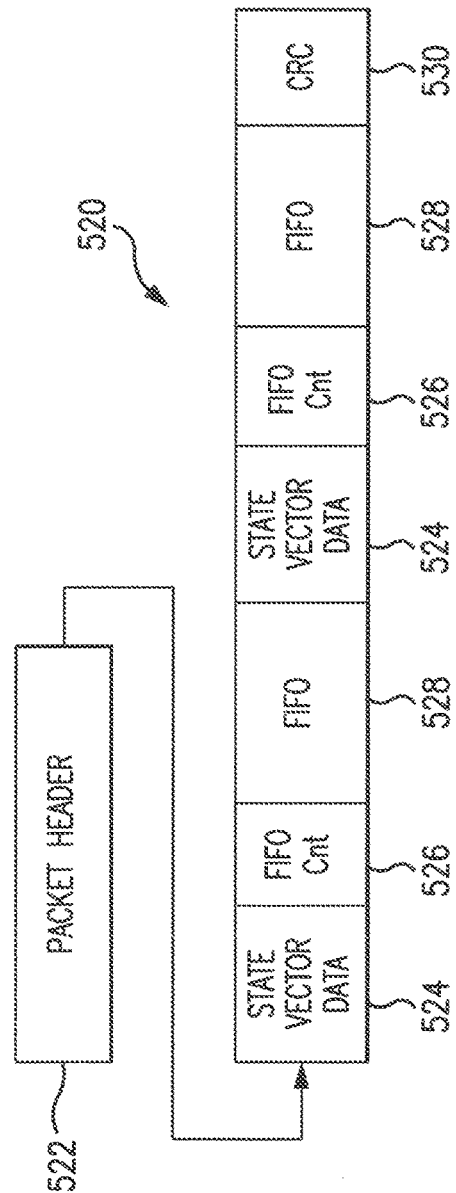
FIG. 5B illustrates the packet format of an initialization mode downlink data packet, in accordance with an embodiment of the present invention.

FIG. 5B illustrates the packet format 520 of an initialization mode downlink data packet in accordance with an embodiment of the present invention. In this case, the downlink data packets are sent by the remote node 104 to the control node 102 operating in an initialization mode. In FIG. 5B, elements 524, 526, 528, 530 correspond to the elements 504, 506, 508, and 510, respectively, in FIG. 5A and a repeated description is omitted.

In summary, various embodiments of the present invention are directed to a self-synchronized multi-domain operational system that includes a control node and a remote node. Once the messaging rate is fixed, it provides deterministic mode of operating for the system and enables determination of corresponding latencies for each exchanged message. Advantageously, the disclosed communication protocol between the command and remote nodes supports variable data rates by utilizing various flag fields described above. The disclosed system provides a unique mechanism for data transfer and synchronization across various platforms. As yet another advantage, the disclosed system facilitates a mechanism for data integrity through packet header data, packet CRC and packet re-transmit capability using particular interfaces and particular data transfer protocols.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN) or WLAN, or the connection may be made to an external computer (for example, through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A multi-processor computer system for ensuring data integrity and time synchronization across a multi-domain operational platform, the computer system comprising:
 a plurality of devices configured to acquire input data related to the multi-domain operational platform;
 a remote node comprising:
  a plurality of co-processors communicatively coupled to the plurality of devices, the plurality of co-processors including logic configured to:
   control acquisition of the input data and analyze the acquired input data;
   receive a first packet from a control node, the first packet comprising a packet header including at least a master timestamp, first control data and a Cyclic Redundancy Check (CRC) value associated with the first control data;
   verify integrity of the received first control data based on the received CRC data; and
   generate and transmit to the control node a second packet, the second packet comprising a packet header including at least a remote timestamp, control data, a CRC value associated with the control data and a subset of the input data; and
 a control node communicatively connected with the remote node via one or more high-speed serial interfaces, the control node comprising:
  one or more processors including logic configured to:
   receive the second packet from the remote node;
   determine status of the first packet based on the control data in the second packet; and
   retransmit the first packet or generate and transmit a third packet based on the determined status of the first packet, the third packet comprising a packet header including at least a master timestamp, second control data and a CRC value associated with the second control data.

2. The system of claim 1, wherein the input data comprises at least one of: inertial data, positional data, and video data related to the multi-domain operational platform.

3. The system of claim 1, wherein the packet header of the first packet and the second packet further includes packet type, packet index, link status and link control information.

4. The system of claim 2, wherein the remote node further comprises one or more buffers configured to store the received video data, wherein the hardware logic of the remote node is further configured to determine whether the one or more buffers contain new video data and wherein the subset of the input data includes the new video data.

5. The system of claim 3, wherein the control node is further configured to perform one or more link management functions using the link status and the link control information.

6. The system of claim 1, wherein the one or more high-speed serial interfaces use Aurora protocol.

7. The system of claim 4, wherein the new video data comprises frame type information, frame index information, video line size information, video information and a CRC value associated with the video information.

8. The system of claim 7, wherein the frame type information includes a flag indicative of frame validity.

9. The system of claim 7, wherein the hardware logic of the control node is further configured to generate one or more video frames based on the received new video data.

10. The system of claim 1, wherein the hardware logic of the control node is further configured to synchronize the master timestamp and the remote timestamp.

11. The system of claim 1, wherein the one or more processors and the plurality of co-processors are configured to operate in one of initialization mode and run-time mode.

12. A method for ensuring data integrity and time synchronization across a multi-domain operational platform, the method comprising steps of:
 receiving, at a remote node, a first packet from a control node, the first packet comprising a packet header including at least a master timestamp, first control data and a CRC value associated with the first control data;
 verifying, at the remote node, integrity of the received first control data based on the received CRC data;
 generating and transmitting from the remote node to the control node a second packet, the second packet comprising a packet header including at least a remote timestamp, control data, a CRC value associated with the control data and a subset of the input data;
 receiving, at the control node, the second packet from the remote node;
 determining, at the control node, status of the first packet based on the control data in the second packet; and
 retransmitting the first packet or generating and transmitting a third packet based on the determined status of the first packet, the third packet comprising a packet header including at least a master timestamp, second control data and a CRC value associated with the second control data.

13. The method of claim 12, wherein the input data comprises at least one of: inertial data, positional data, and video data related to the multi-domain operational platform.

14. The method of claim 12, wherein the packet header of the first packet and the second packet further includes packet type, packet index, link status and link control information.

15. The method of claim 13, wherein the remote node comprises one or more buffers configured to store the received video data, wherein the method further comprises determining, at the remote node, whether the one or more buffers contains new video data and wherein the subset of the input data includes the new video data.

16. The method of claim 14, further comprising performing, at the control node, one or more link management functions using the link status and the link control information.

17. The method of claim 12, wherein the one or more high-speed serial interfaces use Aurora protocol.

18. The method of claim 15, wherein the new video data comprises frame type information, frame index information, video line size information, video information and a CRC value associated with the video information.

19. The method of claim 18, wherein the frame type information includes a flag indicative of frame validity.

20. The method of claim 12, further comprising synchronizing, at the control node, the master timestamp and the remote timestamp.

* * * * *